United States Patent
Kulesza

[11] Patent Number: 5,823,596
[45] Date of Patent: Oct. 20, 1998

[54] TRUCK TAILGATE FENCE MECHANISM

[76] Inventor: Frank H. Kulesza, 3409 Fairway Dr., Cameron Park, Calif. 95682

[21] Appl. No.: 724,644

[22] Filed: Oct. 1, 1996

[51] Int. Cl.$^6$ ............................................. B67C 1/06
[52] U.S. Cl. ................................. 296/26.08; 296/26.01; 296/37.6; 220/403
[58] Field of Search ................. 296/26, 27, 37.6, 296/39.2, 55, 59, 60, 57.1; 224/402, 403, 492, 404, 211

[56] References Cited

U.S. PATENT DOCUMENTS

| | | |
|---|---|---|
| 372,775 | 11/1987 | Stumpf . |
| 850,785 | 4/1907 | Riedinger . |
| 2,556,101 | 6/1951 | Negin et al. .......................... 296/57.1 |
| 2,556,130 | 5/1951 | Whittington .......................... 296/57.1 |
| 2,852,303 | 9/1958 | Hopson . |
| 2,872,239 | 2/1959 | Bowness et al. ...................... 296/57.1 |
| 3,004,790 | 10/1961 | Mayer . |
| 4,472,639 | 9/1984 | Bianchi ................................... 296/26 |
| 4,531,773 | 7/1985 | Smith ..................................... 296/26 |
| 4,778,213 | 10/1988 | Palmer ................................... 296/26 |
| 5,456,511 | 10/1995 | Webber ................................... 296/26 |
| 5,468,038 | 11/1995 | Sauri ................................... 296/57.1 |
| 5,700,047 | 12/1997 | Leitner et al. ....................... 296/37.6 |

*Primary Examiner*—D. Glenn Dayoan
*Assistant Examiner*—Jason Morrow
*Attorney, Agent, or Firm*—Theodore J. Bielen, Jr.

[57] ABSTRACT

A truck tailgate fence mechanism utilizing the existing latch and striker system of the truck tailgate. The mechanism utilizes a wall portion which is positioned on the extended tailgate in an upright orientation. A first fastener removably holds the wall portion to the tailgate and includes a first member which is fastened to the striker of the latch and striker system of the tailgate. A second fastener connects to the wall portion and removably fastens to the latch of the latch and striker system of the tailgate and truck bed partition.

6 Claims, 1 Drawing Sheet

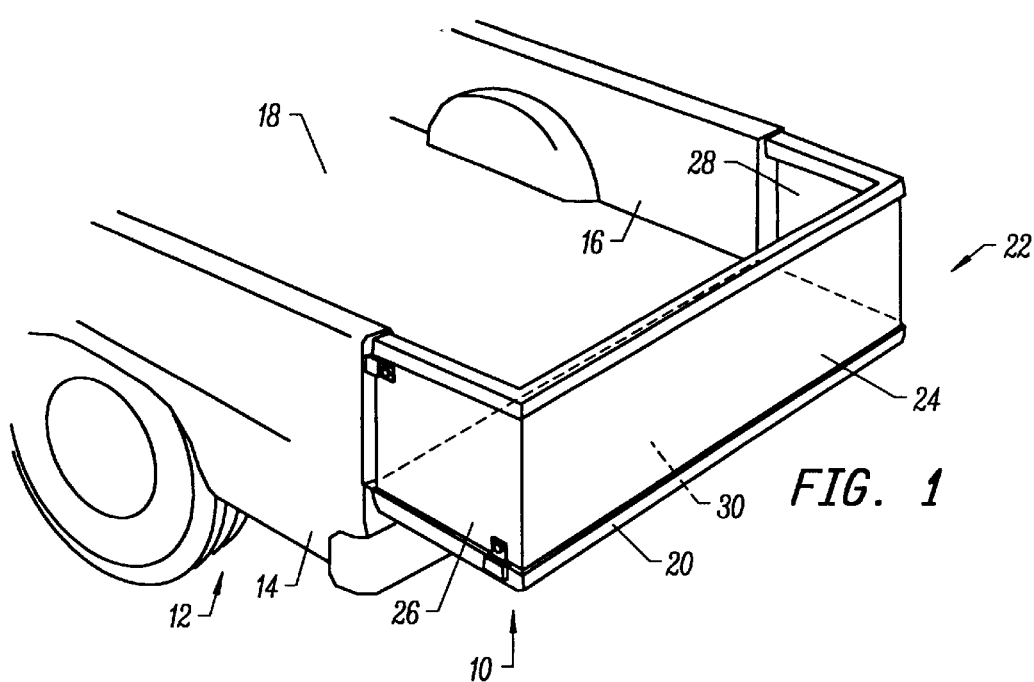
FIG. 1
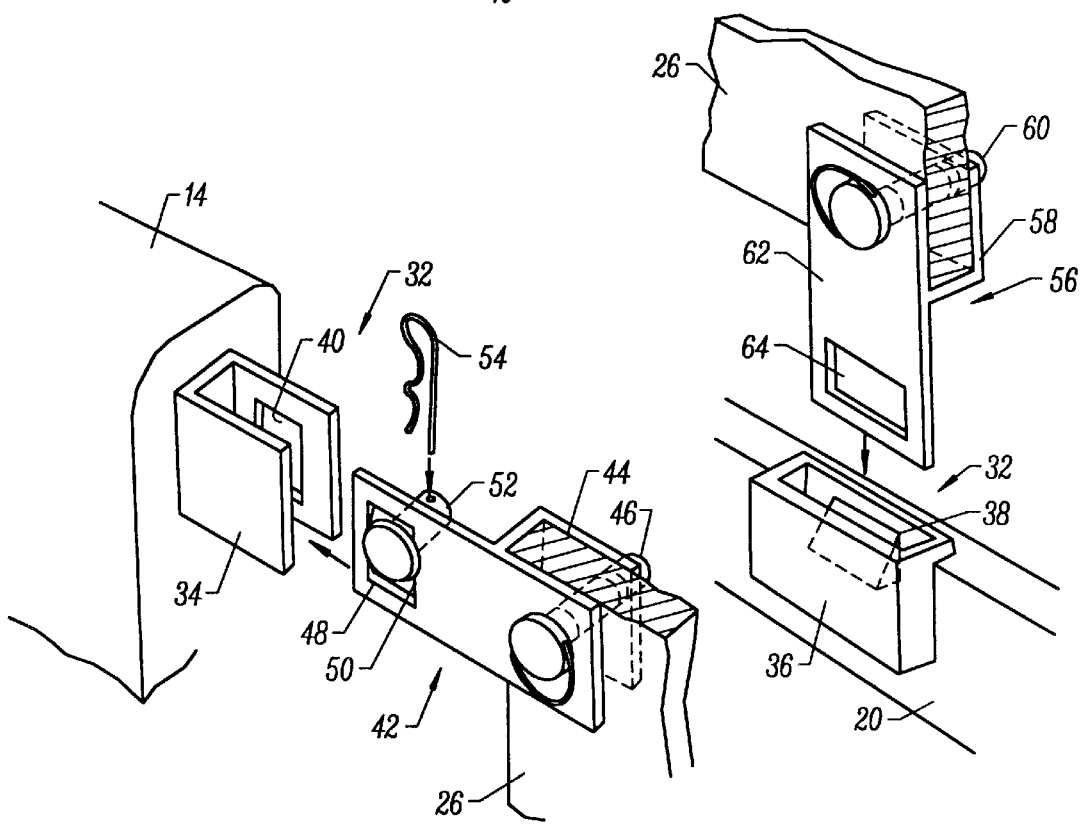
FIG. 2
FIG. 3

TRUCK TAILGATE FENCE MECHANISM

BACKGROUND OF THE INVENTION

The present invention relates to a novel truck tailgate fence mechanism.

The tailgate of pick-up trucks has often been used to extend the load bed of the pick-up truck. Although satisfactory in some cases, cargo in the pick-up truck tends to move off the tailgate when the vehicle is moving. Many systems have been devised to extend truck beds by the use of fences. For example, U.S. Pat. Nos. 5,468,038; 5,456,511; 5,127,697; 4,778,213; 4,531,773; 4,472,639; 3,004,790; 2,852,303; 850,785; and 372,775 show such truck bed extenders. All the prior devised fence systems for tailgates have included special latching mechanisms to hold the fence in place.

A truck tailgate fence mechanism which employs the existing latching system of the truck tailgate without modification would be a notable advance in the transportation field.

SUMMARY OF THE INVENTION

In accordance with the present invention a novel and useful vehicle tailgate fence mechanism is herein provided.

The mechanism of the present invention utilizes the latch and striker system of the tailgate and truck bed side partition, which is typically installed on a pick-up truck at the time it is manufactured. The mechanism utilizes a wall portion which has a rear wall and a pair of wing walls which extend forwardly toward the truck bed side partition. The fence may be constructed of any suitable material to laterally support cargo in a truck bed and on the tailgate.

First fastening means is included in the invention for removably holding the wall portion to the tailgate. The first fastening means possesses a first member connected to the wall portion which is removably fastened to the striker of the latch and striker system of the tailgate and truck bed partition. In many cases, the first fastening means may permit the first member to be removably fastened to the latch of the latch and striker system of the tailgate.

Likewise, second fastening means is employed for removably holding the wall portion to the truck bed side partition. The second fastening means includes a second member connected to the wall portion and removably fastened to the latch and striker system of the tailgate and truck bed partition. Again, in certain cases, the second fastening means may fasten to the striker of the latch and striker system of the tailgate and truck bed partition.

The first and second fastening means may each be removably held to the wall portion extending up from the tailgate. Additionally, each of the first and second members of the first and second fastening means may include a yoke or a bridging member which fits over the wall portion. In each case, a flange would extend from the yoke and be adapted to fasten to the latch and striker system of the tailgate and truck bed partition. The first member flange may also be fastened to the striker of the latch and striker system by the use of a removable pin. The pin may be held in place by a locking element.

It may be apparent that a novel and useful fence mechanism for the tailgate of a truck bed has been described.

It is therefore an object of the present invention to provide a truck tailgate fence mechanism which is easily assembled on the tailgate of a truck in the down position and is lockable in place.

Another object of the present invention is to provide a truck tailgate fence mechanism which utilizes a wall portion that extends upwardly from the truck bed and latches to the latch and striker system of the tailgate and truck bed side partition.

A further object of the present invention is to provide a truck tailgate fence mechanism which includes a locking system utilizing the existing system of the tailgate and truck bed side partition and is adaptable to hold wall portions of many configurations on the tailgate.

The invention possesses other objects and advantages especially as concerns particular characteristics and features thereof which will become apparent as the specification continues.

BRIEF DESCRIPTION OF THE DRAWINGS

FIG. 1 is a top rear, left, perspective view of a pick-up truck bed having its tailgate in the down position with the invention in place.

FIG. 2 is a perspective view showing the first fastening means engaging the striker of the latch and striker system of the truck.

FIG. 3 is a perspective view showing the second fastening means engaging the latch of the latch and striker mechanism of the truck.

For a better understanding of the invention reference is made to the following detailed description of the preferred embodiments thereof which should be taken in conjunction with the prior described drawings.

DETAILED DESCRIPTION OF THE PREFERRED EMBODIMENTS

Various aspects of the present invention will evolve from the following detailed description of the preferred embodiments which should be referenced to the prior delineated drawings.

The invention as a whole is shown in the drawings by reference character 10. The fence mechanism 10 is usable with a pick-up truck 12 having side partitions 14 and 16 which lie on either side of the truck bed 18. Tailgate 20 has been extended to its down position, which renders it generally horizontally aligned with truck bed 18. In many cases, tailgate 20 includes chains or other safety devices to prevent further extension of the tailgate from the that shown in FIG. 1.

Fence mechanism 10 includes as one of its elements wall portion 22. Wall portion 22 includes an end wall 24 and side wings 26 and 28. Wall portion 22 may be formed as unit or include hinges between rear wall 24 and side wings 26 and 28. In the latter case, wall portion 22 would be more easily stored for eventual use. Wall portion 22 fits along the outer perimeter of tailgate 20 on its upper surface 30.

Turning to FIGS. 2 and 3, it may be observed that wall portion 22 is usable with the existing latch and striker system 32 of pick-up truck 12. In general, striker or striker plate 34 is found on FIG. 2 while latch 36 is found on FIG. 3. Latch 36 includes a spring-loaded tongue 38 which is intended to fit in opening 40 of striker 34. Of course, the position of latch 36 and striker 34 may be reversed. Also, latch 36 and striker 34 may be of a different configuration from that depicted in the drawings.

Turning again to FIG. 2, it may be seen that first fastening means 42 is depicted for removably holding wall portion 22 to the truck bed partition 14. First fastening means 42 includes a yoke 44 which extends over wing 26 of wall portion 22. Fastener 46 holds yoke 44 in this position. Flange 48 extends from yoke 44 and includes an opening 50. Pin 52 may be caught in opening 50 and extend through opening 40 of striker 34. Cotter pin locking element 54 locks pin 52 in place.

Second fastening means 56 is also shown for holding wall portion 22, specifically wing 26 to latch 36 of tailgate 20. Again, second fastening means 56 includes a yoke 58 which extends over wing 26 and a fastener 60 which holds yoke in place. Flange 62 extending from yoke 58 includes an opening 64 which engages spring loaded tongue 38 of latch 36. Again, although the striker 34 is shown on truck bed 14 and latch 36 is shown on tailgate 20 on the present application, such mechanism may be reversed. In addition, wing 28 includes a similar system for holding the same to truck bed partition 16 and tailgate 20. It should also be noted that fasteners 46 and 60 may be removable to permit the user to change or replace first and second fastening means from wall portion 22.

In operation, the user erects wall portion 22 on tailgate 20 as shown in FIG. 1. Prior to this positioning, wall portion 22 may be unfolded if hinges are found between end wall 24 and wings 26 and 28. First fastening means is then placed into locking engagement with latch 34 of latch and striker mechanism 32 of truck 12. The second fastening means 56 is then placed into locking engagement with latch 36 of the same mechanism. Pin 52 of first fastening means 42 may be held in place by cotter pin 54 for further securement of the system.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A truck tailgate fence mechanism useable with the latch and striker of the latch and striker system of the tailgate and truck bed partition; comprising:

a. a wall portion positioned in an essentially upright orientation on the extended tailgate relative to the truck bed;

b. first fastening means for removably holding said wall portion to the truck bed partition, said first fastening means including a first member connected to the wall portion and removably selectively fastened to the latch and striker of the latch and striker system of the tailgate and truck bed partition; and c. second fastening means for removably holding said wall portion to the tailgate of the truck, said second fastening means including a second member connected to the wall portion and removably selectively fastened to the latch and striker of the latch and striker system of the tailgate and truck bed partition.

2. The fence mechanism of claim 1 in which said first member is removably held to the wall portion.

3. The fence mechanism of claim 2 in which said second member is removably held to the wall portion.

4. The fence mechanism of claim 1 in which said first member includes a yoke fitting over the wall portion and a flange extending therefrom for fastening to the striker of the latch and striker system of the tailgate and truck bed partition.

5. The fence mechanism of claim 4 in which said second member includes a yoke fitting over the wall portion and a flange extending therefrom for fastening to the latch of the latch and striker system of the tailgate and truck bed partition.

6. The fence mechanism of claim 5 in which said first member flange fastens to the striker of the latch and striker system of the tailgate and truck bed partition by a removable pin.

* * * * *